2,791,055

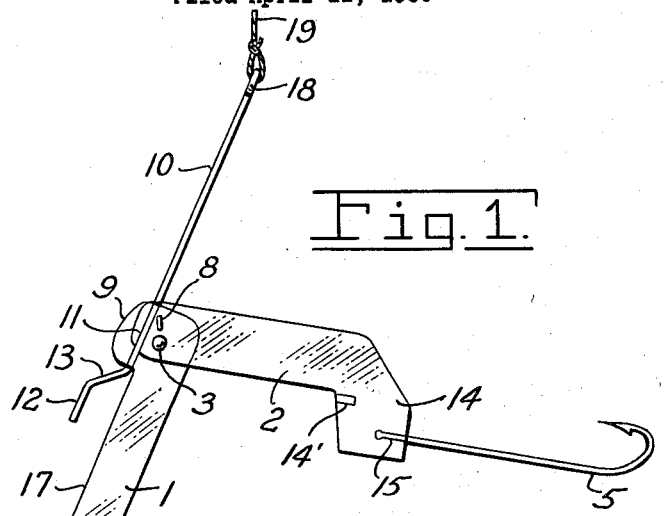
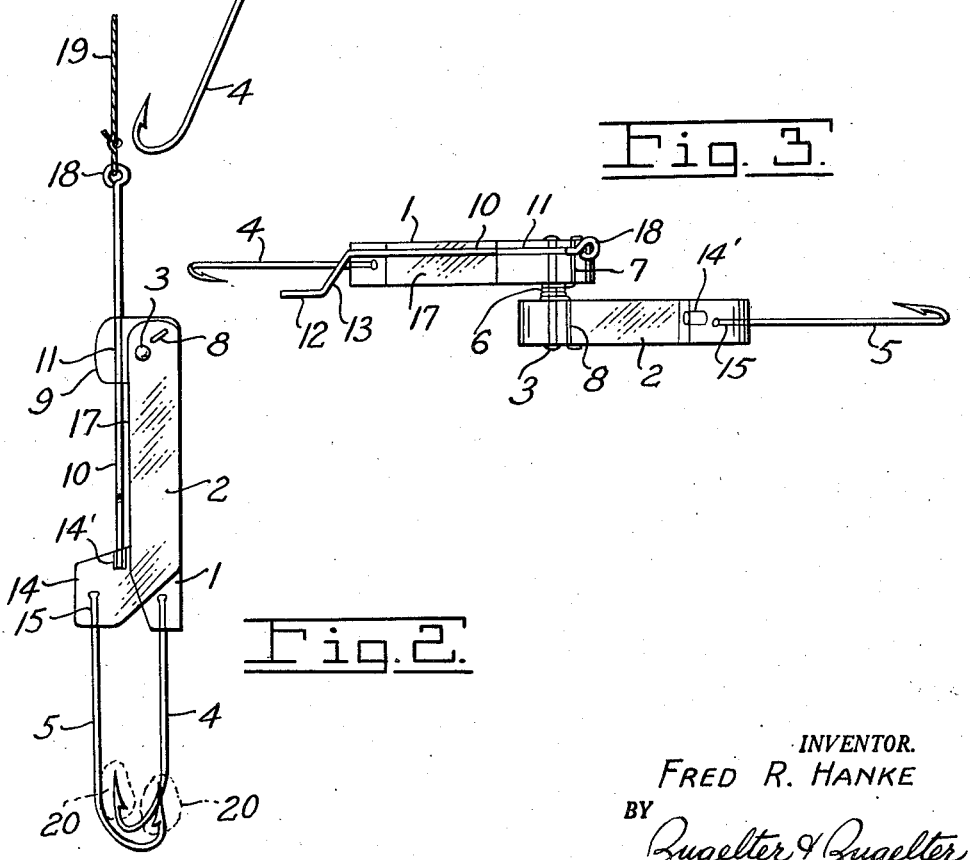

FISHHOOK DEVICES

Fred R. Hanke, Cincinnati, Ohio

Application April 11, 1955, Serial No. 500,567

4 Claims. (Cl. 43—36)

This invention relates to fishhook devices and more particularly to the type which embodies a pair of pivotally mounted hooks that are triggered from a convergent to a divergent position when a fish strikes the bait.

An object of this invention is to provide a hook having a pair of pivotally mounted members, a hook at the free end of each member, spring means for urging the members and the hooks to a divergent position and a trigger for holding the members in a convergent position, the trigger being provided with means for attachment to the line and operable to release the members and the hooks to a divergent position when a fish strikes the bait on the hooks.

Another object is to form the pivotally mounted members referred to in the next preceding object of a thermoplastic resin which is light, corrosion-resistant and which can be colored to be attractive to fish.

Other objects and advantages will be apparent to those of ordinary skill in the art to which the invention pertains from the following description and accompanying drawings.

In the drawings:

Figure 1 is a view of a plural hook device embodying the invention, the hooks being shown in divergent position;

Fig. 2 is a view showing the hooks in convergent position; and

Fig. 3 is a top-plan view of the device with the hooks in divergent position.

In Fig. 1 of the drawings is shown a fishhook device that comprises a pair of members 1 and 2 mounted on a pivot pin 3 at their upper ends and provided with fishhooks 4 and 5 at their respective opposite or free ends as shown.

As shown in Fig. 3 the members 1 and 2 are spaced sufficiently to accommodate a coil spring 6 through which the pivot pin 3 passes, the ends of the spring being anchored in members 1 and 2 as shown at 7 and 8 respectively.

The upper end of member 1 is provided with an offset lug 9 through which a trigger 10 is slidably disposed in a bore 11 in the lug. The trigger 10 as shown in Fig. 1 is offset from the axis of the pivot pin 3.

The lower end of the trigger 10 is provided with a latch portion 12 which is connected to the body of the trigger 10 by an offset or angular portion 13.

The shank of hook 4 extends into a bore in the free end of member 1 and is secured therein in any suitable manner.

Member 2 is of substantially L-shape in that its body portion is relatively straight and its free end is offset as at 14. The offset is provided with a keeper socket 14' for receiving the lower end of trigger latch 12. The shank of the fishhook 5 extends into a bore 15 in the offset 14 and is secured in the bore in any suitable manner.

The spring 6 urges members 1 and 2 to the divergent position shown in Fig. 1. When the members 1 and 2 are moved to the convergent position shown in Fig. 2, the spring is under tension and the trigger 10 is positioned to lock these members in the convergent position. To lock the members in the convergent position the trigger 10 is slipped downwardly through the bore in the lug 9 until the free end of the latch portion is opposite the top surface of offset 14. When the trigger is in this position, the body of it lies against the edge 17 of member 1. By turning the trigger until the free end of portion 12 registers with the socket 14' and pushing the trigger downwardly the end of portion 12 seats in the latch pocket 14'. The hooks 4 and 5 are thus latched in the convergent position of Fig. 2, the spring tension of spring 6 tending to increase the holding power of the trigger.

The upper portion of the trigger 10 is provided with an eye 18 to which the fishline 19 is attached. Thus, when a fish strikes the bait 20 on either hook, the hooks and the members 1 and 2 will slide downwardly on the trigger causing the portion 12 to be released from socket 14' whereupon the spring 6 snaps them into the divergent position of Fig. 1 which will cause the hooks to hook the fish in several places and thereby make more certain that the fish will be securely hooked.

Members 1 and 2 may be made of a thermo-plastic resin, such as "Lucite" and they may be colored with bright colors that have a tendency to attract the attention of fish. If made of such attractive colors the members 1 and 2 with their hooks if spinning at all, will be attractive to the fish and cause them to go for the bait. The minute the bait is struck, the hooks are released towards the divergent position to insure hooking of the fish.

When the members 1 and 2 are made of a thermoplastic resin the free ends of these members are provided with bores to accommodate the upper ends of the shanks of the hooks. The hooks may be placed in these bores and by heating the ends of members 2 which receive the hook shanks to a softened condition and then squeezing those end portions, the hooks are firmly anchored in the supporting members 1 and 2.

The shanks of these hooks may of course be secured in other ways to the members 1 and 2 but the manner indicated is sufficient for the purpose.

Having thus described the invention, it will be apparent to those skilled in the art to which the invention pertains that the illustrated embodiment of the invention may be changed and modified without departing from either the spirit or the scope of the invention.

Therefore, what is claimed as new and desired to be secured by Letters Patent is:

1. A fishhook device comprising a pair of elongated members disposed side by side, a fishhook for each member, each hook having a shank, the shank of one hook being secured to the end of one member and the shank of the other hook being secured to the adjacent end of the other member, a pivot pin extending through said members at a location remote from the ends to which the hooks are secured whereby the members and the hooks may be rotated to convergent and divergent positions respectively, spring means urging said members and hooks to a divergent position, a trigger member slidably mounted in one of said members at a location adjacent said pivot pin and extending downwardly along an edge of said one member, the free end of the other member having a latch keeper, said trigger having an offset portion adapted to be rotated into a position to be received in the latch keeper of the opposite member to hold the members and the hooks in a convergent position, said slidable member having at its opposite end an eyelet to which a line may be attached, said trigger member being adapted to slide and turn to disengage the offset portion of the trigger from the latch keeper and release said hooks and members for movement to a divergent position when a fish strikes bait on said hooks.

2. A fishhook device comprising a pair of members, a pivot pin extending through said members at a location near adjacent ends thereof, a fishhook secured to the opposite end of each member, spring means urging said members and the hooks carried thereby from a convergent to a divergent position about said pivot pin, and a trigger member slidably mounted in one of said members at a location adjacent the pivot pin and extending downwardly along an edge of said member, the other member having a latch keeper, the trigger having at its free end an offset portion adapted to be received in the latch keeper of the other member to lock the hooks and said members in converged position, said slidable trigger member having an eyelet at its upper end to which a fishline may be attached, said offset portion being rotated and released from the keeper when a fish strikes a bait on the hook to thereby cause said members to be actuated by the spring means for movement to said divergent position.

3. A fishhook as in claim 2 in which said elongated members are formed of thermo-plastic resin and that the ends of the shanks of the hooks extend into bores in the free ends of said members and are secured therein.

4. A fishhook device as in claim 1 in which one of said elongated members has a lug at its pivoted end that is offset from the axis of the pivot pin and that the other said elongated member has an offset portion at its free end facing towards the adjacent elongated member when the members are in their divergent position and having a latch keeper socket in its upper face, the trigger member being slidable in the offset portion of the first-mentioned member and extending downwardly along an edge of the same to a location where the free end thereof is insertable into said latch keeper socket when the elongated members are in convergent position.

References Cited in the file of this patent
UNITED STATES PATENTS

| | | |
|---|---|---|
| 5,255 | Pendleton | Aug. 21, 1847 |
| 1,217,769 | Jacobs | Feb. 27, 1917 |
| 2,511,117 | Loeb | June 13, 1950 |